United States Patent [19]

Wahl, III et al.

[11] 4,167,099

[45] Sep. 11, 1979

[54] COUNTERCURRENT DIRECT CONTACT HEAT EXCHANGE PROCESS AND SYSTEM

[75] Inventors: Edward F. Wahl, III, Claremont; Frederic B. Boucher, San Juan Capistrano, both of Calif.

[73] Assignee: Occidental Petroleum Corporation, Los Angeles, Calif.

[21] Appl. No.: 873,264

[22] Filed: Jan. 30, 1978

[51] Int. Cl.² .............................................. F03G 7/00
[52] U.S. Cl. ................................................. 60/641
[58] Field of Search .................... 60/641, 649; 165/45, 165/111, 143, 144

[56] References Cited

U.S. PATENT DOCUMENTS

| | | | |
|---|---|---|---|
| 3,972,193 | 8/1976 | Sherwood | 60/641 |
| 4,063,419 | 12/1977 | Garrett | 60/641 |
| 4,120,158 | 10/1978 | Sheinbaum | 60/641 |

*Primary Examiner*—Allen M. Ostrager
*Attorney, Agent, or Firm*—Max Geldin; Barry A. Bisson; William G. Lane

[57] ABSTRACT

Recovery of energy from geothermal brines and other hot water sources by direct contact heat exchange with a working fluid, such as a hydrocarbon working fluid, e.g. isobutane. The process and system consists of a plurality of stages, each stage including mixing and settling units. In the first stage, hot brine and arm working fluid are intimately mixed and passed into a settler wherein the brine settles to the bottom of the settler and the hot working fluid rises to the top. The hot working fluid is passed to a heat engine or turbine to produce work and the working fluid is then recycled back into the system. The system is comprised of a series of stages each containing a settler and mixer, and wherein the working fluid and the brine flow in a countercurrent manner through the stages to recover the heat from the brine in increments and raise the temperature of the working fluid in increments.

27 Claims, 2 Drawing Figures

COUNTERCURRENT DIRECT CONTACT HEAT EXCHANGE PROCESS AND SYSTEM

BACKGROUND OF THE INVENTION

This invention relates to the recovery of energy from geothermal brines and other hot water sources, and is particularly concerned with a process and system of the aforementioned type, employing direct contact heat exchange between the hot brine or hot water feed, and a working fluid, and employing a plurality of separate stages in which the hot brine or hot water is intimately mixed with the working fluid, and the two fluids thereafter separated in each stage, whereby the heat from the hot brine or hot water is transferred in increments to the working fluid to raise the temperature thereof.

Direct contact heat exchange (DCHE) has been proposed as a method for recovering thermal energy from scale depositing geothermal fluids, e.g. hot geothermal brine. Thus, U.S. Pat. No. 3,988,895 to Sheinbaum discloses power generation from hot brines by passing a hot fluid containing salt such as geothermal brine, in direct contact heat exchange relation with a working fluid such as isobutene.

In the copending application Ser. No. 589,068, filed June 23, 1975, by Samuel G. Woinsky, there is described a process and system for recovery of energy from geothermal brine and other hot water sources, which comprises cooling the brine or hot water source in direct contact heat exchange relation with a working fluid in a direct contact heat transfer column, and having as an important feature the operation of the heat transfer column at or above the critical pressure of the working fluid. In the copending application Ser. No. 611,310, filed June 23, 1975, now U.S. Pat. No. 4,089,175, by Samuel G. Woinsky, there is described a similar process and system as in the above-mentioned application, and having as an important feature operation of the heat transfer column at a pressure below the critical pressure of the working fluid.

The direct contact heat exchangers of the prior art as exemplified above are generally in the form of the sieve-tray type, wherein the liquid brine enters at the top of the column and falls through a series of trays, with the working fluid travelling upward and mixing with the hot brine. The working fluid is then extracted at the top, e.g. as a vapor, where the temperature differences are such that the working fluid passes through its boiling zone. Another type of prior art direct contact heat exchanger employed is of the packed column type wherein mixing of the hot brine and working fluid and countercurrent flow thereof through the column are achieved by passage of the fluids through a mesh or other type of packing.

Other related prior art patents include the Morris U.S. Pat. No. 1,905,185 and the Fricke U.S. Pat. No. 3,164,957, which disclose liquid-liquid direct contact heat exchange, wherein two liquids are permitted to mix for transfer of heat from one liquid to the other, followed by separation of the fluids due to differences in density.

It is accordingly an object of the present invention to provide a process and system for direct contact countercurrent heat exchange between a hot water containing fluid such as geothermal brine, and an immiscible working fluid, employing a plurality of self-contained stages, in each stage of which the working fluid is incrementally heated by the hot aqueous fluid. Another object of the invention is to provide a process and system of the above type, incorporating in each stage mixing and settling of the fluids passing in countercurrent relation to each other. A still further object is the provision of a direct contact heat exchange process and system as described above, having certain advantages over the prior art direct contact heat exchange systems, including safety, reliability and overall economy of operation.

SUMMARY OF THE INVENTION

The above objects and advantages are achieved according to the invention by the feature of providing a plurality of separate stages, incorporating in each stage a mixer-settler system for the direct contact heat exchange of hot geothermal brine or other hot water containing source, with an immiscible working fluid such as a hydrocarbon working fluid. The process and system of the invention include an each stage intimately mixing hot water containing fluid with the working fluid, settling the mixture in a settling zone and separating the mixture into a hot water containing fluid or brine phase and a working fluid phase.

The hot water containing fluid or hot geothermal brine is initially introduced into one end stage such as the first stage of the above-noted plurality of separate stages, and the cold working fluid is introduced into the opposite end stage or last stage of the system. The hot water containing fluid or hot geothermal brine, and the working fluid flow in countercurrent relation through the respective stages and the working fluid is heated in increments by the hot water containing fluid, to thereby raise the temperature of the working fluid.

The resulting hot working fluid discharged from the first stage is passed to an expander or heat engine where it is converted to useable energy or work, and the expanded working fluid is then recycled back into the system.

The mixer-settler system employed in each of the stages for direct contact heat exchange between the hot water containing fluid or geothermal brine and working fluid comprises a mixer in which thorough mixing of the two phases is achieved by means of an agitator, e.g. in the form of an impeller or by running the two phases through a line containing a turbulence generator, known as a static mixer. The mixed phases are then transferred to a settler, e.g. in the form of a settling tank, wherein the two phases are permitted to remain quiescent for a sufficient period of time to permit the heavy phase, e.g. the aqueous or brine phase, to settle to the bottom, and the light working fluid phase to rise to the top. The apparatus can be designed so that the mixing and settling devices are separate and interconnected, or both the mixing and settling devices can be enclosed in a single vessel, if desired.

Any number of stages, each containing a mixer and settler, can be operated as a countercurrent cascade by pumping one phase, that is the hot aqueous liquid or geothermal brine in one direction, and the other phase, the cold working fluid, in the opposite direction, as described in greater detail hereinafter.

The advantages of the process and system of the invention include an economy saving in cost over the prior art direct contact heat exchangers noted above, such as the sieve tray or packed column, because in the present system each stage constitutes a separate unit and its size can be tailored to correspond to the physical properties required for such stage. This is in contrast to the standard sieve tray and packed column arrangement wherein the size of the limiting stage determined the size of the overall or total apparatus. Further, the direct contact heat transfer process and system of the invention provide safety and reliability from the standpoint that one or more separate stages of the system can be shut down by by-passing such stages, without forcing the shut down of the entire system. Thus, the system of the present invention incorporating a mixer and settler device in each stage is desirable for a plant which may require frequent shut downs, e.g. due to solids deposition problems.

THE DRAWING

The above and other features and advantages of the invention will be more clearly understood by reference to the following detailed description of the invention, taken in connection with the accompanying drawing wherein:

FIG. 1 shows a schematic flow diagram of one preferred embodiment of the invention for direct contact heat exchange between hot geothermal brine and a cold working fluid; and FIG. 2 is a diagram illustrating work expansion of the hot working fluid, and recycling of the expanded working fluid to the direct contact heat exchanger.

DESCRIPTION OF THE PREFERRED EMBODIMENT

Figures 1, 2:
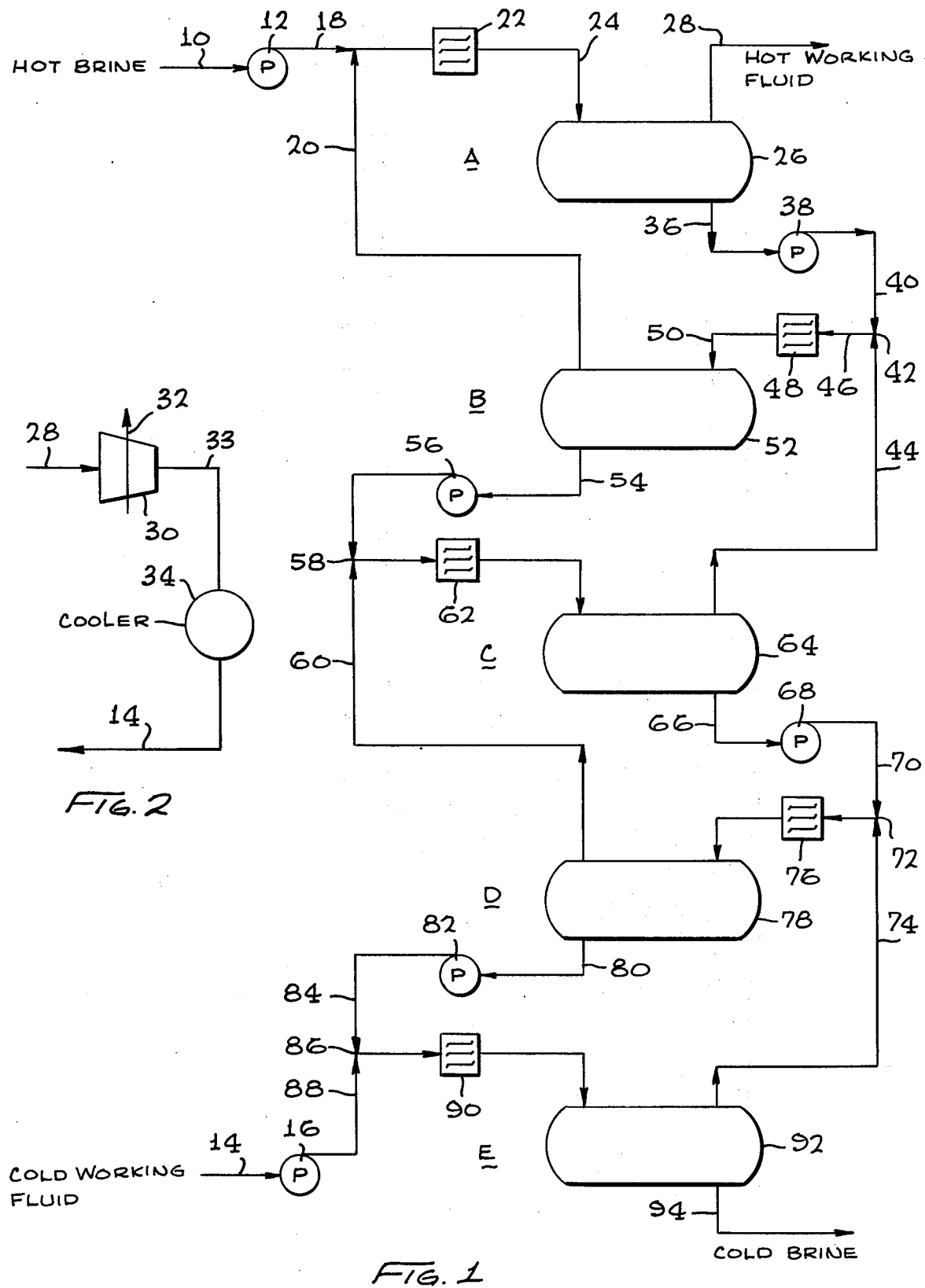

Referring to FIG. 1 of the drawing, geothermal brine or hot water which may be degassed to partially remove noncondensible gases, is delivered from the well (not shown) though the line 10 to a pump 12.

The cold working fluid is introduced at 14 and is likewise pumped up to the above-noted high pressure corresponding to that of the hot brine, by pump 16. Such working fluids can be any suitable material which is immiscible with water, and having a density different from the brine or hot water. Such working fluids preferably have a density less than the density of the hot brine or other hot water containing fluid.

Thus, the working fluid can be a hydrocarbon including aromatics, paraffins, naphthenes and olefins. Preferably, the working fluid is a paraffin or olefinic hydrocarbon containing from about 1 to about 8 carbon atoms, either straight or branched chain such as methane, ethane, propane, n-butane, isobutane, n-pentane, isopentane, neopentane (2,2-dimethyl-propane), n-hexane, cyclo-hexane, n-heptane, n-octane, isooctane, and the analogous olefins such as n-butene, isobutene, and the like. Most desirably, paraffinic or olefinic hydrocarbons containing from about 3 to about 6 carbon atoms are employed. Aromatic hydrocarbons such as benzene, toluene, and xylene also can be used.

Mixtures of such hydrocarbons can also be utilized, such as, for example, a mixture of methane and ethane, ethane and propane, or propane and n-butane, to optimize the critical temperature and pressure conditions of the working fluid, and thereby obtain maximum energy recovery from the geothermal brine or hot water feed.

Working fluids other than hydrocarbons are also suitable provided they at least have the proper density relation to the hot aqueous fluid or brine as noted above, and are immiscible.

Preferred working fluids are n-butane and isobutane.

Inlet temperature of the hot water or brine to one end of the system ranges from about 150° to about 600° F., with a range of about 300° to about 500° F., e.g. about 400° F., being customary for hot geothermal brine. Although the heat exchange system of the invention can be operated above, or below, or at the critical conditions of the working fluid, in one embodiment the system is operated above the critical pressure of the working fluid, such pressure preferably ranging from about 450 psia. to about 1,000 psia., usually from about 500 to 700 psia.

The incoming brine at 18 is introduced into the first stage A of a cascading countercurrent flow system according to the invention, comprised of five separate but interconnected stages including stages A, B, C, D and E. The incoming brine at 18 in the first stage A is combined with the working fluid at 20 coming from the second stage B and the combined mixture is fed to a mixer 22. The mixer 22 can be in the form of an impeller type mixer wherein the two phases, that is the hot brine and the warm working fluid, are thoroughly mixed.

The resulting mixture is then introduced at 24 into a settler in the form of a settling tank 26 wherein the two phase mixture is permitted to remain quiescent for a period of time sufficient to permit the heavy aqueous or brine phase to settle to the bottom of the settling tank and the light working fluid phase to rise and float on the aqueous brine phase in the upper portion of the settling tank.

In the mixer 22 wherein the hot brine is thoroughly mixed with the warm working fluid from the second stage B, direct contact heat transfer takes place between the hot brine and the warm working fluid, to further heat the working fluid, while cooling the brine. Following settling in the settling tank 26, the hot working fluid light phase is withdrawn at 28. Referring to FIG. 2, the hot working fluid at 28 is introduced into an expander 30 for producing work which is taken off as shaft power at 32, and which can be employed for example to operate an electric generator (not shown). The expanded working fluid at 33 is then introduced into a cooler at 34 for condensing the working fluid, and the condensed working fluid at 14 can then be recycled for introduction into the staged countercurrent direct contact heat transfer system shown in FIG. 1.

The cooled brine is withdrawn at 36 from the settling tank 26 of the first stage, and is pumped at 38 through line 40, where it is combined at 42 with working fluid in line 44 exiting the third stage C. The resulting mixture at 46 is introduced into the mixer 48 and the thoroughly mixed phases are introduced at 50 into the settling tank 52 of the second stage B, wherein the two phases are again allowed to separate as noted above. The further cooled heavy brine phase withdrawn at 54 is then pumped at 56 to the third stage C wherein it is first combined at 58 with the working fluid at 60 withdrawn from the fourth stage D. The combined mixture is then introduced into the mixer 62 of the third stage C and the resulting mixture is then allowed to settle in settling tank 64 of the third stage.

Again, further cooled brine is withdrawn at 66 from settling tank 64 and is pumped at 68 through line 70 where it is combined at 72 with working fluid at 74 exiting the fifth stage E. The resulting mixture is introduced into the mixer 76 for thorough mixing of the two phases, following which the mixture is passed into the settling tank 78 of the fourth stage for separation of the two phases.

The further cooled brine exiting settling tank 78, at 80 is pumped at 82 through line 84 and is combined at 86 with cold working fluid introduced into as feed to the fifth stage at 88. The resulting mixture is then fed to the mixer 90 and the two thoroughly mixed phases are then introduced into the settling tank 92 of the fifth stage. The cold brine is then withdrawn at 94 from settling tank 92 and is sent to a sump or brine injection well (not shown).

It is thus seen that the process and system of the invention comprises a series of successive like stages, each stage including a mixing device for thoroughly mixing the two phases of brine or hot water, and working fluid, and a settling tank, which can be a simple tank, and wherein the hot brine or other hot aqueous liquid is introduced into the stage at one end of the tystem and the working fluid is introduced into the stage at the other end of the system, and providing countercurrent flow of brine or other hot aqueous liquid, and working fluid through the successive stages, forming a cascading system, to heat the working fluid in increments in the successive stages. Thus, the hot working fluid exits the system from the same stage that the hot brine or other hot aqueous liquid enters the system.

The mixing section and settling section of each stage are preferably designed as separate components which permits a more optimum design of each section, resulting in reduced cost as compared to a continuous column having, for example, sieve trays. Thus, a mixer-settler countercurrent heat exchange system according to the invention has a lower capital cost as compared to the conventional sieve plate column for direct contact heat exchange.

Further, although the exact nature of the scale deposition problems are not known, such problems are much less severe in the mixer-settler according to the invention, than in a sieve plate or packed column. The reason for this is that the deposition of calcium carbonate type scales which occurs in the upper section of such column where the brine is first injected, usually occurs around the holes in the sieve plate, thus altering the hole diameter and quickly altering the performance of the column. On the other hand, the mixer-settler system of the invention consists of a mixing section through which the fluid flows at a high rate and a large settling section, such as a simple vessel. The deposition of scale will occur in such vessel and thus permit it to be easily handled by mechanical removal means. Furthermore, the performance of the mixer-settler system of the invention will not degrade rapidly as in the case of the above-noted sieve plate and packed columns.

According to one modification of the invention system, instead of employing separate mixer and settling devices, both and mixing and settling sections can be enclosed in a single vessel, such as a horizontal cylinder.

It will also be apparent that any number of stages each containing a mixer and settler, can be operated according to the invention as a countercurrent cascade system in the manner described above, by pumping one phase in one direction and the other in the opposite direction as illustrated in FIG. 1. Thus, at least two stages are required, the process and system of the invention utilizing five stages being a preferred embodiment.

The working fluid can be any substance which is non-reactive and immiscible with the hot aqueous fluid and which has a density difference which enables countercurrent flow with the hot aqueous fluid. Although the working fluid can have a density greater than the brine or hot water containing fluid or liquid, the preferred working fluids have a density less than that of the hot brine or water containing fluid. The hot water containing fluid can have salts such as sodium and magnesium chloride and/or other minerals dissolved therein.

In a specific example of operation of the countercurrent direct contact heat exchange process and system of the invention employing five stages as described above, hot brine at 325° to 400° F., is delivered from the well and is pumped up to a pressure between about 600 and 700 psia. The hot brine is introduced into the first stage of a five stage system as illustrated in FIG. 1. Cold isobutane at 130° F. is pumped up to the above-noted same high pressure as the hot brine and is introduced into the last stage of the system. The incoming brine at the first stage is combined with the isobutane coming from the second stage and is introduced into an impeller type mixer in the first stage. This mixture is then allowed to settle in a settling tank in the first stage, the light isobutane phase rising and the heavy brine phase settling. The hot isobutane at a temperature of about 310° F., is withdrawn from the first stage and passed through an expander for work expanding the isobutane and providing power.

The brine from the first stage is combined with the isobutane from the third stage and the mixture introduced into a mixer in the second stage, and the resulting mixture then passed into the second stage settler where the phases are again allowed to separate. The brine from the second stage is then pumped to the third stage where it is combined with the isobutane of the fourth stage, and the process of heat exchange is repeated in the third, fourth and fifth stages as described above, and illustrated in FIG. 1. The cold brine exiting the fifth stage is at a temperature of about 180° F.

From the foregoing, it is seen that the invention provides a unique process and system for countercurrent direct contact heat exchange between hot brine or other hot aqueous liquid and an immiscible working fluid, incorporating a plurality of like stages, each containing like but separate mixer-settler devices, wherein the working fluid is heated in increments, the process and system being efficient, reliable and economical.

While we have described particular embodiments of the invention for purposes of illustration, it will be understood that various changes and modifications within the spirit of the invention can be made, and the invention accordingly is not to be taken as limited except by the scope of the appended claims.

What is claimed is:

1. A process for recovery of energy from hot water containing fluid including geothermal brine and other hot water containing sources, which comprises passing said hot water containing fluid into direct contact heat exchange relation with an immiscible working fluid in a plurality of separate stages, including in each stage intimately mixing said hot water containing fluid with said working fluid, settling said mixture in a settling zone and separating said mixture into a hot water containing fluid phase and a working fluid phase, introducing said hot water containing fluid into one end stage of said plurality of separate stages and introducing cold working fluid into the opposite end stage, whereby said hot water containing fluid and said working fluid flow in countercurrent relation through said stages and said working fluid is heated in increments by said hot water containing fluid to raise the temperature of said working fluid, and withdrawing and extracting energy from said hot working fluid.

2. The process as defined in claim 1, wherein said working fluid has a density different from said hot water containing fluid.

3. A process for recovery of energy from hot water containing fluids including geothermal brine and other hot water containing sources, which comprises passing said hot water containing fluid into direct contact heat exchange relation with an immiscible working fluid having a density less than the density of said hot water containing fluid, in a plurality of separate stages, including in each stage intimately mixing said hot water containing fluid with said working fluid, settling said mixture in a settling zone and separating said mixture, whereby said hot water containing fluid settles to the bottom of said zone and said working fluid rises to the top of said zone, introducing said hot water containing fluid into one end stage of said plurality of separate stages and introducing cold working fluid into the opposite end stage, whereby said hot water containing fluid and said working fluid flow in countercurrent relation through said stages and said working fluid is heated in increments by said hot water containing fluid to rise the temperature of said working fluid, and withdrawing and expanding hot working fluid to produce work.

4. The process as defined in claim 3, wherein said hot water containing fluid is introduced into the first stage of said plurality of stages and said working fluid is introduced into the last stage, and including withdrawing the hot working fluid from the settling zone of said first stage.

5. The process as defined in claim 3, including a separate mixing zone and a separate settling zone in each of said stages, said zones being interconnected.

6. The process as defined in claim 4, wherein the hot water containing fluid passing to the first stage is mixed with working fluid from a second stage, and hot water containing fluid passing to the second stage is mixed with working fluid from a third stage.

7. The process as defined in claim 5, wherein the hot water containing fluid passing to the first stage is mixed with working fluid from a second stage, and hot water containing fluid passing to the second stage is mixed with working fluid from a third stage.

8. The process as defined in claim 3, wherein the working fluid is a hydrocarbon.

9. The process as defined in claim 3, wherein said hot water containing fluid is brine and said working fluid is a hydrocarbon.

10. The process as defined in claim 6, wherein said hot water containing fluid is brine and said working fluid is a hydrocarbon.

11. The process as defined in claim 3, wherein said working fluid is butane or isobutane.

12. The process as defined in claim 10, wherein said working fluid is butane or isobutane.

13. The process as defined in claim 3, wherein the temperature of hot water containing fluid ranges from about 150° to about 600° F., and the pressure of said hot water containing fluid ranges from about 450 psia. to about 1,000 psia.

14. The process as defined in claim 10, wherein the temperature of said brine ranges from about 300° to about 500° F., and the pressure of said brine ranges from about 500 to about 700 psia.

15. A process for direct contact heat exchange between a hot geothermal brine and an immiscible working fluid, which comprises:

in a first stage intimately mixing in a first mixing zone said hot geothermal brine and immiscible heated working fluid from a succeeding stage, said working fluid having a lower temperature and a lower density than said hot brine, thereby further heating said working fluid and cooling said hot geothermal brine, passing said mixture into a first settling zone and separating said mixture into a cooled heavy geothermal brine phase and a hot light working fluid phase, removing said hot working fluid phase for extraction of energy therefrom, and withdrawing said heavy geothermal brine phase; and in a second stage intimately mixing in a second mixing zone said geothermal brine withdrawn from said first stage and immiscible working fluid at a temperature lower than said last-mentioned geothermal brine, thereby heating said working fluid and further cooling said geothermal brine, passing said last-mentioned mixture into a second settling zone, separating said mixture into a heavy geothermal brine phase and a heated light working fluid phase, passing said last-mentioned heated working fluid to said first stage for said mixing therein with said hot geothermal brine, and withdrawing the resulting further cooled geothermal brine.

16. The process as defined in claim 15, including in one or a plurality of additional successive stages, additionally intimately mixing geothermal brine withdrawn from the preceding stage and immiscible working fluid at a lower temperature from a subsequent stage, thereby heating said working fluid and still further cooling said brine, and separating said mixture into a heavy geothermal brine phase and a light working fluid phase as aforesaid, and passing said last-mentioned heated working fluid to said preceding stage.

17. The process as defined in claim 16, wherein said working fluid is a hydrocarbon working fluid, and wherein said working fluid and said geothermal brine flow counter-currently through the successive stages, the hot geothermal brine being fed to the first stage and cold working fluid being fed to the last stage, to recover heat from said brine in increments.

18. The process as defined in claim 17, wherein the temperature of said brine ranges from about 300 to about 500° F., and the pressure of said brine ranges from about 500 to about 700 psia.

19. A system for recovery of energy from hot water containing fluids including geothermal brine and other hot water containing sources, which comprises a plurality of separate stages for passing said hot water containing fluid into direct contact heat exchange with an immiscible working fluid, each stage including mixing means for intimately mixing said hot water containing fluid with said working fluid, settling means for settling said mixture into a hot water containing fluid phase and a working fluid phase, means for introducing hot water containing fluid into one end stage of said plurality of stages, means for introducing working fluid into the opposite end stage of said plurality of stages, and conduit means interconnecting the respective stages for passing said hot water containing fluid and said working fluid in countercurrent flow relation through said stages, whereby said working fluid is heated in increments by said hot water containing fluid to raise the temperature of said working fluid.

20. The system as defined in claim 19, said one end stage into which said hot water containing fluid is introduced being the first stage of said plurality of stages and said opposite end stage into which said cold working fluid is introduced being the last stage, means for withdrawing the hot working fluid phase from the settling means in said first stage, work expander means, and means for introducing said hot working fluid phase withdrawn from said first stage into said expander means to produce work.

21. The system as defined in claim 19, said mixing means in each stage including agitator means, said settling means in each stage comprising a settling tank, said mixing means and said settling tank in each stage being separate and interconnected.

22. The system as defined in claim 20, including conduit means for combining the hot water containing fluid passing to said first stage with working fluid withdrawn from the second stage, and conduit means for combining the hot water containing fluid withdrawn from said first stage and passing to said second stage, with working fluid withdrawn from a third stage.

23. The system as defined in claim 17, said hot water containing fluid being hot geothermal brine and said working fluid being a hydrocarbon having a density less than the density of said geothermal brine.

24. The system as defined in claim 21, including conduit means for combining the hot water containing fluid passing to said first stage with working fluid withdrawn from the second stage, and conduit means for combining the hot water containing fluid withdrawn from said first stage and passing to said second stage, with working fluid withdrawn from a third stage.

25. A system for direct contact heat exchange between hot geothermal brine and an immiscible hydrocarbon working fluid, which comprises at least a first stage and a second stage, said first stage comprising a first mixing means and a first settling means, conduit means interconnecting said first mixing means and said first settling means, said second stage comprising a second mixing means and a second settling means, conduit means interconnecting said second mixing means and said second settling means, conduit means for combining hot geothermal brine passing to said first mixing means in said first stage with working fluid withdrawn from the settling means in said second stage, means for withdrawing the hot working fluid phase from said first settling means, a work expander, means for introducing said hot working fluid withdrawn from said first settling means into said work expander to produce work, conduit means for combining the geothermal brine phase from the settling means in said first stage with working fluid, conduit means for passing the combined working fluid into said second settling means in said second stage, and conduit means for withdrawing geothermal brine from said second settling means in said second stage.

26. The system as defined in claim 25, including one or a plurality of additional successive stages, each of said stages including mixing means and settling means, conduit means interconnecting said mixing means and said settling means, conduit means for combining geothermal brine withdrawn from the second settling means in said second stage with working fluid from a subsequent stage, means for introducing said combined mixture into the mixing means of said one additional successive stage, conduit means for passing the working fluid withdrawn from the settling means of said one additional successive stage and combining same with hot brine introduced into the second mixing means of said second stage, and means for withdrawing geothermal brine from said one additional successive stage.

27. The system as defined in claim 26, including conduit means for flowing hot geothermal brine and working fluid countercurrently through the successive stages, including means for introducing hot geothermal brine into the first stage and means for introducing working fluid into the last stage, for effecting said countercurrent flow.

* * * * *

UNITED STATES PATENT AND TRADEMARK OFFICE
CERTIFICATE OF CORRECTION

PATENT NO. : 4,167,099

DATED : September 11, 1979

INVENTOR(S) : Edward F. Wahl, III and Frederick B. Boucher

It is certified that error appears in the above-identified patent and that said Letters Patent are hereby corrected as shown below:

Please add the following language as the second paragraph of the specification:

"The Government has rights in this invention pursuant to Contract No. EX-76-C-01-2000 awarded by the U.S. Department of Energy."

Signed and Sealed this

Thirtieth Day of December 1980

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 4,167,099
DATED : September 11, 1979
INVENTOR(S) : Edward F. Wahl, et. al.

It is certified that error appears in the above—identified patent and that said Letters Patent is hereby corrected as shown below:

Please add the following language as the first paragraph under the heading "Background of the Invention".

--The Government has rights in this invention pursuant to Contract No. DE-AC03-76ET28410 (formerly EY-76-C-03-1076 and E(04-3)1076) awarded by the U.S. Department of Energy.--

Signed and Sealed this

Twelfth Day of June 1984

[SEAL]

Attest:

Attesting Officer

GERALD J. MOSSINGHOFF

Commissioner of Patents and Trademarks